Nov. 3, 1959  G. B. MARZOLF, SR  2,911,239
MULTIPLE PIECE PIPE FLANGE
Original Filed Dec. 31, 1956
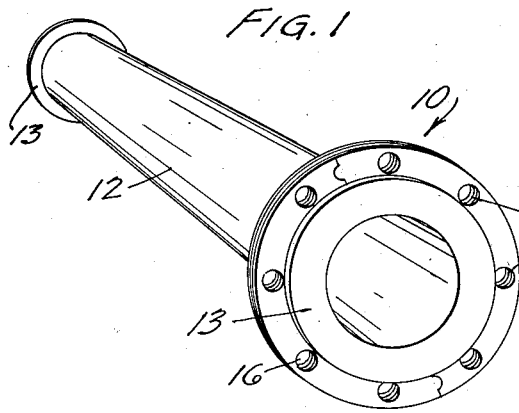
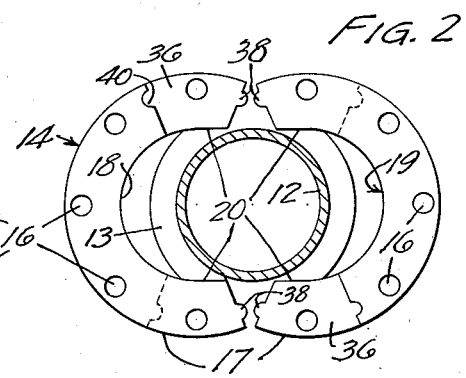
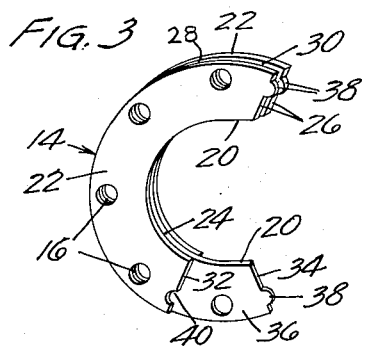
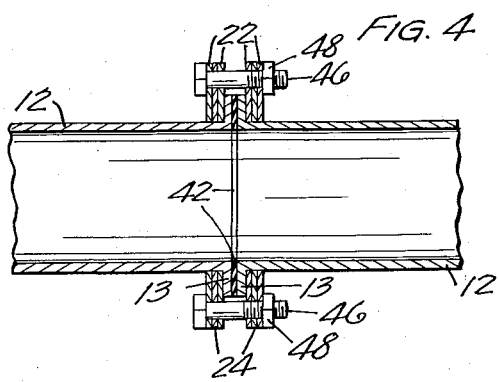
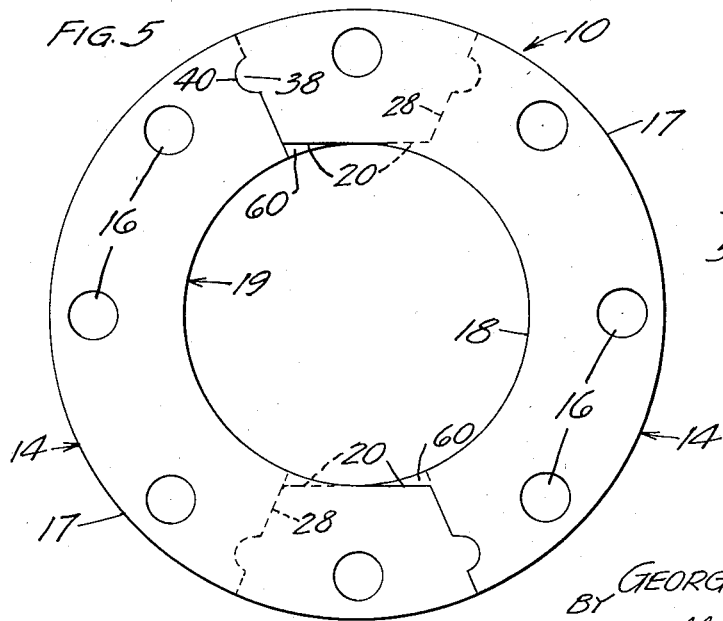
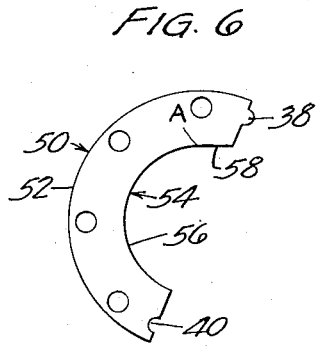
INVENTOR
GEORGE B. MARZOLF, SR.
BY Carpenter, Abbott, Coulter, & Kinney
ATTORNEYS United States Patent Office 2,911,239
Patented Nov. 3, 1959

2,911,239

MULTIPLE PIECE PIPE FLANGE

George B. Marzolf, Sr., St. Paul, Minn.

Continuation of abandoned application Serial No. 631,946, December 31, 1956. This application May 18, 1959, Serial No. 813,873

4 Claims. (Cl. 285—415)

The present invention relates to coupling flanges for pipe line and other heavy piping installations. More particularly the invention is directed to a laminated, multiple piece coupling flange and is a continuation of my copending application Serial No. 631,946, filed December 31, 1956, and now abandoned.

In the construction of pipe lines and the like, the pipe sections making up the pipe line are usually provided with end flanges to stiffen the ends of the sections and enable the sealing between adjacent ends of packing flanges. Coupling, or back up, flanges encompass the adjacent sections in back of and in abutment with the end flanges; and, to form the joints between sections, the flanges are drawn toward one another by means of flange bolts.

Customarily the coupling or back up flanges are of a unitary, one piece construction—usually of cast iron—and create awkward and time consuming procedures both in mounting on and removal from pipe sections. Initially, this flange construction requires that the flanges be mounted on each pipe section prior to the attachment of at least one of the end flanges thereon; in other words, these flanges must be applied prior to completion of the fabrication of the pipe. Consequently fabrication of the pipe sections is normally completed only at the pipe line site as the sections are placed. Further, should the flange break while in use on the pipe line, removal and replacement is difficult and tedious, requiring removal of the flanged end of the pipe section and the packing flange at the joint between sections in addition to the back up flange in order to replace it.

It is an object of this invention to provide a multiple piece laminated coupling flange which may be applied to a pipe section after complete fabrication of the section and which may be replaced after the section has been installed in a pipe line without mutilation of the pipe section on which it is mounted and without disruption or replacement of the packing flange at the adjacent pipe joint.

Another object of this invention is to provide a laminated multiple piece coupling flange wherein the pieces thereof are of unique construction, each lamina of each flange piece being identical to all other laminae of the piece, the flange pieces being adapted for exact interfitting relation with one another to provide the assembled flange with smooth, unbroken edge and face surfaces.

Another object of this invention is to provide a laminated coupling flange which is more resistant to breakage than a solid flange, and which effects more uniform stress distribution in the pipe joint.

These and other objects are accomplished by the multiple piece flange of this invention, a preferred embodiment of which is illustrated in the accompanying drawing wherein:

Figure 1 is a perspective view of the flange mounted on a pipe section;

Figure 2 is a cross-sectional view of a pipe section illustrating the manner in which the flange is mounted thereon;

Figure 3 is a perspective view of one of the pieces of the flange;

Figure 4 is a longitudinal cross-sectional view of a pair of the flanges coupling adjacent pipe sections to one another;

Figure 5 is an enlarged front view of the flange; and

Figure 6 is a front view of a lamina of one of the pieces of the flange.

Referring now to the accompanying drawings in detail there is shown in Figure 1 a coupling flange 10, embodying the invention, mounted on a pipe section 12 behind and in abutment with one of the end flanges 13 of the section.

As is most clearly apparent in Figure 2, the illustrative coupling flange 10 is a multiple piece flange comprising two identical C-shaped or U-shaped pieces 14, each having apertures 16 through the body at spaced intervals along the length thereof for the passage of flange coupling bolts therethrough.

The outer edge surface 17 of each piece 14 defines a sector of a circle somewhat greater than a half circle concentric to the curvature of the pipe section, and is generally C-shaped. The central portion 18 of the inner edge surface 19 defines a half circle conforming to half the circumference of the pipe 12, the terminal portions 20 of the inner edge surface extending tangentially from the central portion thereof to the ends of the piece, so that the inner edge surface is generally U-shaped. Thus as the pieces 14 are moved toward one another for mounting on the pipe, the adjacent ends of the pieces lap one another so that when the flange 10 is mounted on the pipe, the outer edge surfaces 17 form a complete circle concentrically spaced from the pipe surface and the inner edge surfaces 19 of the pieces define a circular surface conforming to and abutting the circumferential surface of the pipe. The apertures 16 adjacent the lapped ends of the pieces 14 are spaced to align with one another when the flanges 10 is assembled so that the passage of a flange coupling bolt therethrough locks the lapped ends of the pieces 14 to one another.

In Figure 3 each piece 14 is seen to comprise a laminated member composed of outer, flat sided, facing layers 22 having a filler layer 24 interposed therebetween, the layers being conveniently spot welded to one another and preferably comprised of mild steel or aluminum. Although each of the layers is illustrated as comprising a single lamina, obviously any number of laminae may be used to make up each layer depending on the strength or other characteristics desired to suit the flange 10 to a particular job.

One set of ends 26 of the facing layers 22 projects beyond one end 28 (Fig. 5) of the filler layer 24, providing a slot 30 in one end of the piece 14. The other set of ends 32 of the facing layers 22 terminate short of the other end 34 of the filler layer 24 and overlie the opposite sides of the body thereof, the end portion of the filler layer 24 projecting beyond the ends 32 of the facing layers and forming a tongue 36 on the other end of the piece 14. Since the laminae are identical, the tongue 36 of one piece 14 fits completely within the slot 30 on the adjacent end of the other piece 14 with the tongue end 34 of the filler layer 24 of one piece abutting the recessed end 28 of the filler layer 24 of the other piece, and the ends 32 of the facing layers 22 of one piece abutting the ends 26 of the other piece. With these end formations on each piece, the ends of the pieces not only lap, but interfit with one another and provide the assembled flange with smooth, unbroken flat side walls. This is important since otherwise the tightening down of the flange bolts in coupling the flanges of adjacent pipe sections to one another would set up uneven stresses within the flanges and weaken the flanges.

While the tongue and slot interfit could be provided with solid body pieces, the laminated structure (aside from providing certain economic advantages over such a solid structure) has a high degree of flexibility enabling more even stress distribution throughout the flange and compensates more readily for differences in expansion and contraction rates of the pipe joint parts.

To prevent shear displacement and assure exact mating of the flange pieces 14 relative to one another, the abutting ends of the laminae are provided with complementary detents 38 and recesses 40 which interfit with one another as the pieces 14 are assembled to form the coupling flange 10. The value of these features has been established through actual usage of these laminated, multiple piece flanges in pipe line installations.

The utilization of the coupling flanges 10 in joining adjacent ends of pipe sections 12 to one another is shown by the longitudinal cross sectional view of Figure 4. As shown, a packing flange or sealing gasket 42 is disposed between the end flanges 13 of the adjacent pipe sections 12. The coupling flanges 10 are mounted on the pipe sections behind and in abutment with the end flanges 13. Flange bolts 46 pass through the flange apertures 16, and the flanges 10 are drawn toward one another, to seat the packing flange or gasket 42 and complete the joint between sections 12, by tightening down the flange nuts 48.

As noted previously, each lamina of each piece 14, in the illustrative structure shown, is identical to every other lamina. The structure of the individual laminae and the manner in which they are laminated in the formation of each piece 14, to provide the completed flange 10 with circular outer and inner edge surfaces, are unique. This lamina structure and the manner of laminating the laminae in the formation of one of the flange pieces 14 are illustrated in Figures 5 and 6.

In Figure 6 there is shown an individual lamina 50 comprising a flat body having a semi-circular outer edge section 52. The inner edge surface 54 has a portion 56, beginning at one end thereof and continuing from said one end in an arcuate path forming an arcuate portion somewhat less than a complete semi-circle, terminating at point A, spaced from the other end. The remaining portion 58 of the inner edge surface 54 diverges from said arcuate path at an angle no less than tangentially from point A of the section 56 to the end of lamina 50 forming a diverging end portion on said lamina.

When the laminae 50 are laminated to one another in the formation of each flange piece 14 as shown in Figure 5, adjacent laminae of each piece are reversely disposed relative to one another with the arcuate portions of the inner edge surfaces thereof forming a completely semi-circular inner edge intermediate the ends of the piece. Thus, the lamina forming the filler layer 24 has its ends reversed from those of the outer layers 22 so that the inner edge surface of the tongue 36 thereof, which projects beyond the ends 32 of the outer layers 22, is curved for a portion of its length. This curved inner edge surface portion of the tongue 36 immediately adjacent the divergent terminal portion 20 serves as an extension of the circular shaped inner edge surfaces 56 of the outer layers 22. The outer layers 22 of each flange piece, being reversely disposed from the filler layer 24, have their divergent terminal portions 20 of their inner edge surfaces parallel to that of the tongue 36 of the piece and the curved inner edge surfaces thereof immediately adjacent their divergent terminal portions 20 extend somewhat beyond the end 28 of the filler layer 24 of the piece. This relation of the layers to one another completes the intermediate semi-circular inner edge surface of the piece and provides the piece with end portions continuing beyond a semi-circle and spaced apart never less than a distance equal to the diameter of the semi-circle for slipping over a pipe to provide interfitting or lapping engagement with its companion flange piece.

It is this extension of the arcuate curvature of the pieces by one layer beyond another that creates the relief 60 shown clearly in Figure 5 when the flange pieces are interfitted with one another in the formation of the completed flange.

The construction of these flange pieces from individual and identical laminae to enable the pieces to encompass a pipe in lapping engagement with one another has solved a problem of long standing in the coupling flange art.

While the invention has been described and illustrated with reference to a preferred embodiment thereof, numerous modifications and changes will occur to those skilled in the art, and all such are comprehended. For example, the flange may be comprised of three, four or more pieces, rather than two. However, normally a portion of the inner edge surface of each piece is arcuate, for conforming to the surface of a pipe on which the flange is to be mounted, and at least one terminal portion of the inner edge surface of each piece diverges at least approximately tangentially from the arcuate portion thereof, so that the lapped end portions of the pieces provide the flange with a smoothly arcuated continuous inner edge surface conforming generally to the circumference of the pipe surface over which it is to fit.

My multiple piece pipe flanges are made for a wide range of pipe sizes, especially those having diameters from about 2 inches to 30 inches.

What I claim is:

1. A two-piece coupling flange for encompassing a pipe and joining two sections of flanged pipe in end to end relationship in a pipeline, the pieces of said flange each having the central portion of the inner edge surface thereof arcuately shaped, the terminal portion of the inner edge surface of each piece diverging at least approximately tangentially from said arcuately shaped portion and being parallel or divergent to a tangential line extended from the other terminal portion of said inner edge surface, the adjacent ends of said flange pieces abutting one another to provide the completed coupling flange, each of said flange pieces being made up of at least three identical flat laminae secured in lapped relation to one another, each lamina of said identical laminae having an inner edge surface beginning at one end thereof continuing from said one end in an arcuate path forming an arcuate portion somewhat less than a complete semicircle, and thence diverging from said arcuate path at an angle no less than tangential therefrom and continuing to the opposite end of said lamina forming a diverging end portion on said lamina, adjacent laminae of each piece being reversely disposed relative to one another and overlapping one another with the arcuate portions of the inner edge surfaces thereof forming a completely semicircular inner edge portion intermediate the ends of said piece, the diverging end portions of adjacent laminae of each piece and an arcuately equal adjacent arcuate portion thereof extending beyond said one end of each adjacent laminae and interfitting with the similarly extending end portions of the other flange piece in the formation of said coupling flange, the extending end portion of each lamina having at least one aperture therethrough aligned with an aperture of the extending end portion of the interfitting lamina of the other flange piece for the passage of a fastener therethrough.

2. The flange of claim 1 wherein the adjacent ends of said flange pieces abutting one another have interfitting terminally situated detents and recesses.

3. A two-piece coupling flange for encompassing a pipe and joining two sections of flanged pipe in end to end relationship in a pipeline, the pieces of said flange each having the central portion of the inner edge surface thereof arcuately shaped, the terminal portion of the inner edge surface of each piece diverging at least approximately tangentially from said arcuately shaped portion and being parallel or divergent to a tangential line extended from the other terminal portion of said inner edge surface, the adjacent ends of said flange pieces abutting one another to provide the completed coupling flange, each of said flange pieces being made up of at least two identical flat laminae secured in lapped relation to one another, each lamina of said identical laminae having an inner edge surface beginning at one end thereof continuing from said one end in an arcuate path forming an arcuate portion somewhat less than a complete semicircle, and thence diverging from said arcuate path at an angle no less tangential therefrom and continuing to the opposite end of said lamina forming a diverging end portion on said lamina, adjacent laminae of each piece being reversely disposed relative to one another and overlapping one another with the arcuate portions of the inner edge surfaces thereof forming a completely semicircular inner edge portion intermediate the ends of said piece, the diverging end portions of adjacent laminae of each piece and an arcuately equal adjacent arcuate portion thereof extending beyond said one end of each adjacent laminae and interfitting with the similarly extending end portions of the other flange piece in the formation of said coupling flange, the extending end portion of each lamina having at least one aperture therethrough aligned with an aperture of the extending end portion of the interfitting lamina of the other flange piece for the passage of a fastener therethrough.

4. A two-piece coupling flange for encompassing a pipe and joining two sections of flanged pipe in end to end relationship in a pipeline, each coupling flange piece being made up of at least two identical sheet metal laminae secured in lapped relation to one another, each lamina of said identical laminae having an inner edge surface beginning at one end thereof continuing from said one end in an arcuate path forming an arcuate portion somewhat less than a complete semicircle, and thence diverging from said arcuate path at an angle no less than tangential therefrom and continuing to the opposite end of said lamina forming a diverging end portion on said lamina, adjacent laminae of each piece being reversely disposed relative to one another and overlapping one another with the arcuate portions of the inner edge surfaces thereof forming a completely semicircular inner edge portion intermediate the ends of said piece, the diverging end portions of adjacent laminae of each piece and an arcuately equal adjacent arcuate portion thereof extending beyond said one end of each adjacent laminae and interfitting with the similarly extending end portions of the other flange piece in the formation of said coupling flange, the extending end portion of each lamina having at least one aperture therethrough aligned with an aperture of the extending end portion of the interfitting lamina of the other flange piece for the passage of a fastener therethrough.

References Cited in the file of this patent

UNITED STATES PATENTS

| | | |
|---|---|---|
| 630,641 | Albree | Aug. 8, 1899 |
| 1,525,647 | Haughey | Feb. 10, 1925 |
| 1,784,667 | Gillet | Dec. 9, 1930 |
| 2,362,454 | Damsel | Nov. 14, 1944 |
| 2,764,431 | Wilde | Sept. 25, 1956 |

FOREIGN PATENTS

| | | |
|---|---|---|
| 6,709 | Great Britain | May 19, 1886 |
| 192,388 | France | 1888 |